United States Patent [19]

Shiraishi

[11] Patent Number: 5,348,989
[45] Date of Patent: Sep. 20, 1994

[54] INK VOLATILIZATION PREVENTING COMPOSITION FOR AQUEOUS BALL POINT PEN

[75] Inventor: Katsuhiko Shiraishi, Yokohama, Japan

[73] Assignee: Mitsubishi Pencil Kabushiki Kaisha, Tokyo, Japan

[21] Appl. No.: 36,476

[22] Filed: Mar. 24, 1993

[30] Foreign Application Priority Data

Mar. 25, 1992 [JP] Japan .................. 4-097466

[51] Int. Cl.$^5$ .................. C09D 5/00; C09D 11/00
[52] U.S. Cl. .................. 523/161; 106/20 R; 523/160; 524/588
[58] Field of Search ............. 523/160, 161; 524/588; 106/20 R

[56] References Cited

FOREIGN PATENT DOCUMENTS

| | | |
|---|---|---|
| 57-153070 | 9/1982 | Japan . |
| 57-200472 | 12/1982 | Japan . |
| 61-057673 | 3/1986 | Japan . |
| 61-145269 | 7/1986 | Japan . |
| 61-151289 | 7/1986 | Japan . |
| 61-200187 | 9/1986 | Japan . |
| 61-268786 | 11/1986 | Japan . |
| 62-050379 | 3/1987 | Japan . |
| 62-148581 | 7/1987 | Japan . |
| 63-006077 | 1/1988 | Japan . |

*Primary Examiner*—John Kight, III
*Assistant Examiner*—Terressa Mosley
*Attorney, Agent, or Firm*—Darby & Darby

[57] ABSTRACT

The present invention provides an ink volatilization preventing composition for an aqueous ball point pen which is to be put onto the upper surface of an aqueous ink having a viscosity of from $10^{-3}$ to 2 Pa sec (25° C.) in an ink tank of the aqueous ball point pen, said composition being obtained by blending a gelling agent and a polyether-modified silicone with a slightly volatile organic liquid.

This composition can move together with the ink in the ink tank of the ball point pen without reducing the amount of the composition filled at an initial time, so that the prevention effect of the composition volatilization can be maintained until the ink has been all consumed. In consequence, it is not necessary to fill a large amount of the composition, in contrast to a conventional ink back-blow preventer, and thus there is an advantage that the amount of the ink to be filled can be increased as much as a reducible amount of the composition.

5 Claims, No Drawings

INK VOLATILIZATION PREVENTING COMPOSITION FOR AQUEOUS BALL POINT PEN

BACKGROUND OF THE INVENTION (i) Field of the Invention

The present invention relates to an ink volatilization preventing composition for an aqueous ball point pen. More specifically, it relates to an ink volatilization preventing composition which prevents the volatilization of an ink in an aqueous ball point pen having an ink tank capable of directly accommodating the ink and which achieves the shelf stability of the ink.

(ii) Description of the Related Art

Heretofore, in a ball point pen having an ink tank into which an ink is directly filled, a back-flow preventer has been put onto the upper surface of the ink in the ink tank in order to prevent the back-flow of the ink. Japanese Patent Laid-open No. 57-153070 discloses such a back-flow preventer, for example, a composition comprising dibenzylidene sorbitol and ethylene glycol, and in Japanese Patent Laid-open No. 57-200472, there is disclosed a composition obtained by dissolving an amino acid derivative in a nonvolatile organic liquid such as vaseline, followed by gelation.

Furthermore, in Japanese Patent Laid-open Nos. 61-57673, 61-145267, 61-151289, 61-200187, 61-268786, 62-50379 and 60-148581, there are disclosed compositions obtained by adding polyoxyethylenesorbitan monolaurate, glycerin dioleate, sorbitan monooleate, pentaerythritol stearate, polyethylene glycol diisostearate, N-oxyethylamine and polyoxyethylene curing castor oil to polybutene and silica.

In general, the ink back-flow preventer in the ink tank is required to follow the movement of the ink owing to the properties of the preventer. However, in the case of the aqueous ball point pen, an ink consumption is about 0.1 g to 0.2 g per 100 m of writing, and this consumption is very large in view of a fact that in the case of an oil ball point pen having a similar structure, the ink consumption is about 0.01 g to 0.04 g per 100 m of writing. In consequence, the aqueous ball point pen consumes the ink rapidly. In the case that the ink is quickly consumed, it seems that the ink back-flow preventer does not adhere to the ink tank, but in fact, the preventer adheres to the inside wall of the ink tank in the state of a film, and when the consumption of the aqueous ball point ink proceeds, the ink back-flow preventer which remains on the upper surface of the ink is surely reduced.

Owing to such a problem, there is a drawback that the conventional ink preventer must be filled as much as about 5% to 20% of the ink tank.

SUMMARY OF THE INVENTION

An object of the present invention is to solve the above-mentioned problem and to provide an ink volatilization preventing composition for an aqueous ball point pen without any drawback of a conventional ink back-flow preventer. That is, it is to provide an ink volatilization preventing composition for an aqueous ball point pen which can move at a velocity equal to that of the ink to extremely inhibit the ink from adhering to the inside wall of an ink tank and which can prevent the volatilization of water or an organic solvent in the ink.

An ink volatilization preventing composition for an aqueous ball point pen of the present invention is directed to a composition which is put onto the upper surface of an aqueous ink having a viscosity of from $10^{-3}$ to 2 Pa sec (25° C.) in an ink tank of the aqueous ball point pen, said composition being obtained by blending a gelling agent and a polyether-modified silicone with a slightly volatile organic liquid.

In the present invention, the slightly volatile organic liquid means a slightly volatile liquid, a nonvolatile liquid or a mixture thereof.

DETAILED DESCRIPTION OF PREFERRED EMBODIMENT

Examples of a slightly volatile organic liquid which can be used in a composition of the present invention include mineral oils, animal and vegetable oils, esters, high-boiling hydrocarbons, higher fatty acids, higher alcohols and low-molecular weight polyolefins. Typical examples include vaseline, spindle oil, castor oil, olive oil, liquid paraffin and polybutene having an average molecular weight of 300–3000. The amount of the slightly volatile organic liquid to be used is in the range of from 80 to 90% by weight, preferably from 92 to 97% by weight with respect to the weight of the composition.

Examples of a gelling agent which can be used in the present invention include microparticle silica, metallic soaps such as magnesium stearate, calcium stearate, aluminum stearate and zinc stearate, inorganic pigments such as bentonite and carbon black, and an organic pigment such as Phthalocyanine Blue. Preferable examples of the gelling agent are silica materials having a hydrophobic surface such as Aerosil R974, R972 and R976 made by Nippon Aerosil Co., Ltd. The amount of the gelling agent to be used is in the range of from 1 to 15% by weight, preferably from 3 to 8% by weight.

Examples of a polyether-modified silicone which can be used in the composition of the present invention include a side chain-modified type silicone such as a dimethylpolysiloxane represented by the formula

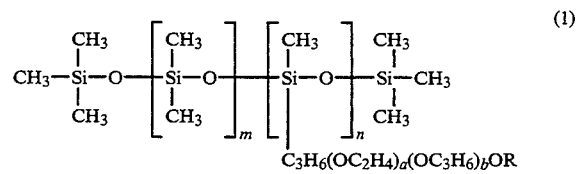

(1)

wherein a, b, m and n are integers, R is an alkyl group preferably 1 to 5 carbon atoms or hydrogen, and molecular weight is 500–10000; and a terminal-modified type silicone such as a dimethylpolysiloxane represented by the formula

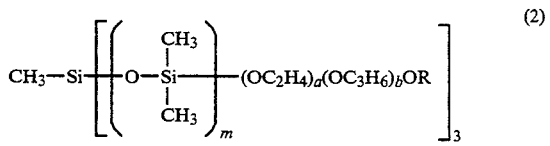

(2)

wherein a, b and m are integers, and R is an alkyl group preferably 1 to 5 carbon atoms or hydrogen.

As usual preparation methods of these modified silicones, there are a method in which a dimethyl polysiloxane having an Si—H group and a polyether having a carbon-carbon double bond at a molecular terminal are subjected to an addition reaction in the presence of a platinum catalyst, and a method in which a dimethyl polysiloxane having an Si-H group is subjected to a dehydrogenation reaction with a polyether having a hydroxyl group at a molecular chain terminal.

For example, the following synthetic method can be exemplified.

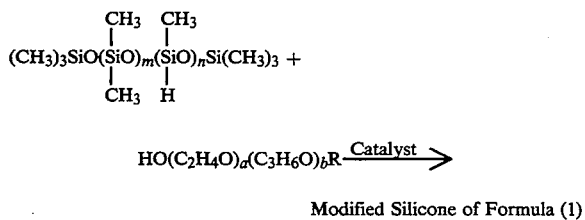

Modified Silicone of Formula (1)

wherein a, b, m and n as well as R are as defined above.

Examples of the usable polyether include polyethylene glycol, polypropylene glycol and ethylene glycol-propylene glycol copolymer.

The solubility of the selected polyether in the solvent depends upon a blend ratio of the dimethyl polysiloxane to the polyether or a propylene oxide/ethylene oxide ratio in the polyether. Furthermore, the properties of the polyether depend upon an organic group at its molecular chain terminal.

Typical examples of the polyether-modified silicone in the composition of the present invention include "SILWET L-722"[corresponding to an above-mentioned formula (2) (viscosity=130 cSt)], "Y-7006" [corresponding to an above-mentioned formula (1) (viscosity=1200 cSt, surface tension=30.1 dyne/cm)], "FZ-2110"[corresponding to the formula (1) when a=0 (viscosity=170 cSt)], and "FZ-2171" [corresponding to the formula (1) when b=0 (trade names, made by Nippon Unicar Co., Ltd.)].

The amount of the polyether-modified silicone to be blended is in the range of from 0.01 to 5% by weight, preferably from 0.1 to 2% by weight with respect to the weight of the composition.

The composition of the present invention can be obtained by adding the polyether-modified silicone and the gelling agent to one or plural kinds of slightly volatile solvent as a base material, and then kneading the mixture by a kneader or a three-roll mill to achieve gelation.

The ink to which the composition of the present invention can be applied is a usual aqueous ball point ink which can be filled into an ink tank of an aqueous ball point pen, and it has an ink viscosity of $10^{-3}$ to 2 Pa sec (25° C.).

When the composition of the present invention is put onto the upper surface of the ink in the ink tank of the ball point pen, a much thinner film than when a conventional ink back-flow preventer is used is formed between the inside wall of the ink tank and the composition, and afterward the composition moves together with the ink. Therefore, the amount of the remaining composition on the upper surface of the ink is substantially constant from an initial time during the movement of the ink. In consequence, the composition on the upper surface of the ink keeps a constant thickness and separates the ink from an outside atmosphere, whereby the volatilization of the ink can be effectively prevented.

Furthermore, the composition of the present invention which is comparable to a conventional product as an ink back-flow preventer can be obtained by adjusting the strength of false plasticity or plasticity with the gelling agent and by selecting the slightly volatile solvent having a suitable viscosity.

An ink volatilization preventing composition for a ball point pen of the present invention can move together with an ink in an ink tank in the ball point pen and can adhere to the inside wall of the ink tank in the form of an extremely thin film. Therefore, the ink volatilization preventing composition can be maintained on the upper surface of the ink in about the same amount as at an initial time even after writing has been proceeded, so that even if the composition is filled at an initial time in a much smaller amount than when a conventional ink back-flow preventer is used, the effect of preventing the ink volatilization can be kept up until all of the ink has been consumed. Thus, it is possible to increase the amount of the filling ink as much as about 5-15% than when a conventional aqueous ball point pen having the ink tank capable of directly accommodating the ink is used.

In addition, the ink volatilization preventing composition can move together with the ink in the ink tank, and therefore also as an ink back-flow preventer, it has a performance comparable to that of the conventional preventer.

EXAMPLES

Next, the present invention will be described in more detail in reference to examples. However, the scope of the present invention should not be limited to these examples.

Volatilization preventing compositions in the examples and comparative examples were evaluated as follows.

A ball point ink comprising the following composition was filled into an ink tank (a transparent polypropylene tube having an inner diameter of 3 mm) over a length of about 100 mm.

| | |
|---|---|
| Dye (trade name "Water Black 187", made by Orient Chemical Industry Co., Ltd.) | 8 parts by weight |
| Polyvinyl pyrrolidone ("PVP K-90" made by GAF Co. Ltd.) | 3 parts by weight |
| Potassium Oleate | 1 part by weight |
| Ethylene Glycol | 30 parts by weight |
| Water | 58 parts by weight |

Each of compositions obtained in the examples and comparative examples was put onto the upper surface of the ink in the ink tank over a length of 5 mm, and spiral writing was then carried out as much as 400 m at a speed of 5.5 mm/minute by a pen having a phosphorus bronze tip (a ball was made of a hard metal tungsten carbide and had a diameter of 0.7 mm) at its top (writing load=100 gf). After the writing, a length of the remaining composition on the upper surface of the ink was measured from the outside of the ink tank.

Furthermore, the ink tank, the tip, the ink to be filled, the composition and the pen were first weighed, and a difference between the weights of the pen before and after the writing is measured and the weight of the remaining ink was then calculated from this difference. The ink was allowed to stand at 50° C. at 30% RH for 60 days in a thermostat chamber, and it was then allowed to cool to room temperature. The weight of the remaining ink was similarly calculated, and a weight change ratio was then obtained.

In addition, the above-mentioned pen was assembled and then allowed to stand in an upright state at 50° C. at 80% RH for one week in the thermostat chamber, and presence or absence of back flow was then observed.

The results of the examples and the comparative examples are set forth in Table 1.

EXAMPLE 1

| | |
|---|---|
| Polybutene (trade name "Nissan Polybutene 015N", made by Nippon Oils & Fats Co., Ltd.) | 95 parts by weight |
| Micloparticle silica (trade name "Aerosil R972", made by Nippon Aerosil Co., Ltd.) | 5 parts by weight |
| Polyether-modified Silicone ("SILWET L-722" made by Nippon Unicar Co., Ltd.) | 1 part by weight |

The above-mentioned materials were kneaded by a three-roll mill to obtain an ink volatilization preventing composition.

EXAMPLE 2

| | |
|---|---|
| Polybutene (trade name "Nissan Polybutene 5N", made by Nippon Oils & Fats Co., Ltd.) | 97 parts by weight |
| Micloparticle silica (trade name "Aerosil R972", made by Nippon Aerosil Co., Ltd.) | 3 parts by weight |
| Polyether-modified Silicone ("SILWET L-7006" made by Nippon Unicar Co., Ltd.) | 0.1 part by weight |

The above-mentioned materials were kneaded by a three-roll mill to obtain an ink volatilization preventing composition.

EXAMPLE 3

| | |
|---|---|
| Polybutene (trade name "Polybutene HV-15", made by Nippon Petrochemical Co., Ltd.) | 96 parts by weight |
| Micloparticle silica (trade name "Aerosil R974", made by Nippon Aerosil Co., Ltd.) | 4 parts by weight |
| Polyether-modified Silicone ("SILWET FZ-2110" made by Nippon Unicar Co., Ltd.) | 1 part by weight |

The above-mentioned materials were kneaded by a three-roll mill to obtain an ink volatilization preventing composition.

EXAMPLE 4

| | |
|---|---|
| Polybutene (trade name "Nissan Polybutene 3N", made by Nippon Oil Co., Ltd.) | 95 parts by weight |
| Micloparticle silica (trade name "Aerosil R974", made by Nippon Aerosil Co., Ltd.) | 5 parts by weight |
| Polyether-modified Silicone ("SILWET L-2171" made by Nippon Unicar Co., Ltd.) | 1 part by weight |

The above-mentioned materials were kneaded by a three-roll mill to obtain an ink volatilization preventing composition.

COMPARATIVE EXAMPLE 1

| | |
|---|---|
| Plybutene (the same as in Example 1) | 95 parts by weight |
| Micloparticle silica (the same as in Example 1) | 5 parts by weight |
| Polyoxyethylene Lauryl Ether | 1 part by weight |

The above-mentioned materials were kneaded by a three-roll mill, and the resultant product was compared with that of Example 1.

COMPARATIVE EXAMPLE 2

| | |
|---|---|
| Polybutene (the same as in Example 2) | 97 parts by weight |
| Micloparticle silica ("Aerosil 380" made by Nippon Aerosil Co., Ltd) | 3 parts by weight |
| Glyceryl Dioleate | 1 part by weight |

The above-mentioned materials were kneaded by a three-roll mill, and the resultant product was compared with that of Example 2.

COMPARATIVE EXAMPLE 3

| | |
|---|---|
| Polybutene (the same as in Example 3) | 95 parts by weight |
| Micloparticle silica (the same as in Example 3) | 4 parts by weight |
| Sorbitan Trioleate | 1 part by weight |

The above-mentioned materials were kneaded by a three-roll mill, and the resultant product was compared with that of Example 3.

TABLE 1

| | Example | | | | Comp. Example | | |
|---|---|---|---|---|---|---|---|
| | 1 | 2 | 3 | 4 | 1 | 2 | 3 |
| Filling Length of Composition | 5 mm | 4 mm | 5 mm | 5 mm | 0 mm | 0 mm | 0 mm |
| Weight Change Ratio | ±0% | ±0% | ±0% | ±0% | −70% | −70% | −70% |
| Back-Flow | None | None | None | None | None | None | None |

All of the compositions filled in the above-mentioned amounts in the comparative examples corresponding to conventional ink back-flow preventers adhered on the side wall of the ink tank, so that they did not remain at all on the upper surface of the ink after writing of 400 m, which meant that any effect of preventing the ink volatilization was not present.

In consequence, the ink which could be used for the writing was about half of the filled ink.

In view of the above-mentioned results, the compositions of the comparative examples are required to be filled into the ball point pen over a length of 15 mm or more, though the filling length of the compositions of the present invention is 5 mm.

What is claimed is:

1. An ink volatilization preventing composition for an aqueous ball point pen which is to be put onto the upper surface of an aqueous ink having a viscosity of from $10^{-3}$ to 2 Pa sec (25° C.) in an ink tank of the aqueous ball point pen, said composition being obtained by blending a gelling agent and a polyether-modified silicone with a slightly volatile organic liquid.

2. The ink volatilization preventing composition for an aqueous ball point pen according to claim 1 wherein said slightly volatile organic liquid is at least one selected from the group consisting of vaseline, spindle oil, castor oil, olive oil, liquid paraffin and polybutene having an average molecular weight of 300–3000.

3. The ink volatilization preventing composition for an aqueous ball point pen according to claim 1 wherein said gelling agent is at least one selected from the group consisting of microparticle silica, magnesium stearate, calcium stearate, aluminum stearate, zinc stearate, bentonite, carbon black and phthalocyanines.

4. An ink volatilization preventing composition for an aqueous ball point pen which comprises 80 to 90% by weight of a slightly volatile organic liquid, 1 to 15% by weight of a gelling agent, and 0.01 to 5% by weight of a polyether-modified silicone.

5. An ink volatilization preventing composition for an aqueous ball point pen which comprises 90 to 97% by weight of polybutene having a molecular weight of from 300 to 3000, 3 to 8% by weight of microparticle silica, and 0.1 to 2% by weight of a polyether-modified silicone.

* * * * *